Patented Dec. 18, 1951

2,578,710

UNITED STATES PATENT OFFICE 2,578,710

RIBOFLAVIN-LACTIC ACID CONDENSATION PRODUCTS

Ben L. Maizel and Irving Gerson, Chicago, Ill., assignors to Vico Products Company, Chicago, Ill., a corporation of Illinois No Drawing. Application July 22, 1947, Serial No. 762,820

12 Claims. (Cl. 260—211.3)

Our invention relates to the treatment of 9-polyhydroxyalkyl-isoalloxazines as, for example, 9 - (1,1' - arabityl) - 6,7 - dimethyl - isoalloxazine; 9 - (d,1' - ribityl) - 7 - monomethyl-isoalloxazine; 9 - (d,1' - ribityl) - 6 - monomethyl-isoalloxazine; 9 - (d,1' - ribityl) - 6 - ethyl - 7 - methyl isoalloxazine; 9 - (d - ribityl) - 6,7 - dimethyl - isoalloxazine (more commonly denoted by the term riboflavin). The invention is concerned particularly with the production of new and useful derivatives of said isoalloxazines having a high degree of solubility in water and other aqueous media. The invention will be particularly described hereafter in connection with the treatment of riboflavin, which is perhaps the commonest of the 9-polyhydroxy-alkyl-isoalloxazines, but it will be understood that it is applicable to the treatment of the class of 9-polyhydroxy-alkyl-isoalloxazines generally.

It is well known that riboflavin, a member of the so-called water-soluble B complex group of vitamins, is characterized by relatively low solubility in water, only 0.11 mg. to 0.12 mg. of riboflavin being soluble in 1 cc. of water. The recommended minimal daily dose of riboflavin is 2 mg. It is generally considered desirable to have the required quantity of riboflavin in one teaspoon (4 to 5 cc.) when the product is used orally, and in 1 cc. when the product is used parenterally. It is obvious that these conditions cannot be met by solutions prepared by dissolving crystalline riboflavin in pure water.

The problem has been recognized and numerous attempts have been made to solve it. In general, two different types of approach have been made. In one, additives which apparently do not react with riboflavin but in whose presence riboflavin is more soluble have been utilized. Thus, for example, riboflavin is more soluble in the presence of various hydroxy-benzoic acids, as is disclosed in Patents Nos. 2,395,378 and 2,407,624. Such methods, while effective to increase the solubility of riboflavin in water, are, nevertheless, unsatisfactory because the hydroxybenzoic acids are physiologically active and, hence, are undesirable in parenteral solutions. In oral products, they have a distinctive taste, and, furthermore, their action frequently is nullified by the presence of other components commonly used in oral preparations.

The other general approach has been to react riboflavin with various types of compounds to produce water-soluble riboflavin derivatives. Thus, in Patent No. 2,111,491, certain phosphoric acid derivatives of riboflavin are disclosed. The disadvantages of practices such as are disclosed in said patent may be considered in the light of the fact that several hundred to several thousand parts of solvent are used per part of riboflavin in the production of the soluble derivatives. Any procedure requiring the handling of such enormous volumes, apart from any other factors, makes processing unwieldy and expensive and recovery difficult.

Analogous difficulties and objections obtain with respect to such proposals as are described in Patent No. 2,358,356, wherein condensation products of riboflavin with succinic acid or phthalic acid or their anhydrides are disclosed. Aside from the large volume of solvents utilized per part of riboflavin with the obviously concomitant disadvantage of such practice, long reaction periods are required and the solubility of the ultimately obtained product still is not all that is desired to be.

Other procedures suggested, which have various disadvantages and objections either from the process conditions required to be used or from the standpoint of the character of the final products, or both, are disclosed in Patents Nos. 2,332,543; 2,388,261; and 2,398,706.

In accordance with our invention, water-soluble derivatives of riboflavin may be prepared in a simple and easy manner in excellent yields, and said derivatives are characterized by exceptionally good solubility with high retentivity of their physiological activity. We have found that lactic acid may be reacted or condensed with riboflavin, as hereinafter described, under conditions where no diluents or solvents are employed. By condensing, we mean a reaction at a temperature of in excess of 100 degrees C. wherein the lactic acid combines with the riboflavin. Thus, for example, commercial lactic acid (containing from 70% to 85% lactic acid) is preferably initially heated to remove at least most of the water content thereof. The resulting lactic acid product is then heated with riboflavin under controlled conditions of time and temperature. In general, at about 150 degrees C., the reaction time is approximately one-half hour or slightly more or less to obtain a solution which does not precipitate upon the addition of water. If heated for too long a period or at too high a temperature, or both, undue polymerization appears to take place with resultant decrease in recovery.

We have found that if the reaction is carried out in the presence of acetic anhydride, propionic anhydride, or phosphoric acids, such as so-called 100% phosphoric acid, $P_2O_5$, pyrophosphoric and other polyphosphoric acids, there is, in general, somewhat of a reduction in the reaction time which is required to obtain a clear solution. More importantly, however, the acetic anhydride, propionic anhydride, and the phosphoric acid product appear to exert a protective action so that polymerization is inhibited for a substantial period of time, for example, for from one-half hour to two hours or more.

In general, when operating at temperatures below 140 degrees C., the reaction time is unduly prolonged. We prefer, therefore, to carry out the reaction at a temperature of at least 150 degrees C. and, where acetic anhydride, propionic anhydride, or phosphoric acid is not utilized, preferably at 160 degrees C. to 165 degrees C. Where acetic anhydride, propionic anhydride, or phosphoric acid is employed in the reaction, good results are obtained with reaction periods of one to two hours at temperatures of the order of 150 degrees C. The condensation product of the riboflavin with the lactic acid which is obtained pursuant to the present invention shows an approximately 80% to 90% recovery of riboflavin as checked by both fluorometric and microbiological methods.

The novel riboflavin lactic acid condensation product may be recovered in the form of an aqueous or other solution containing a high concentration of riboflavin. Thus, for example, aqueous solutions can be obtained containing several mg. up to more than 40 mg. of riboflavin per cc. The reaction mixture may, if desired, be neutralized with an innocuous alkaline material, for example, sodium hydroxide. If desired, the reaction mixture may be purified by extraction of the excess or unreacted lactic acid with ether or similar solvents. If ether is added to the cooled reaction mixture, a yellow material precipitates out which, in general, contains better than 90% of total riboflavin potency. It may be purified further by dissolving it in hot isopropyl alcohol and precipitating it by cooling and by the addition of ether. The final product usually has a potency of 500 mg. per gram and is soluble in water to the extent of about 50 mg. per gram. If a solid product is not desired, a volume of water equal to about one-half of the volume of lactic acid may be added to the reaction mixture and the unreacted or excess lactic acid extracted with ether or the like.

The proportions of lactic acid and riboflavin utilized in the reaction are subject to wide variation. In general, we prefer to employ a substantial excess of lactic acid over that amount which enters into the reaction with the riboflavin and condenses therewith to form the new and useful products of the present invention. We find it satisfactory, in most cases, to use from about 7 to 15 parts, by weight, of lactic acid per part, by weight, of riboflavin or other similar isoalloxazine. Where acetic anhydride, propionic anhydride, or phosphoric acid, or mixtures thereof, are employed, the proportions thereof are also variable, but good results are obtained where the amounts are of the order of the amounts of riboflavin or somewhat more or less.

The following examples are illustrative of the practice of our invention. Various changes may be made therein with respect to proportions of ingredients, reaction temperatures and time, and the like, as will appear clear to those versed in the art in the light of our disclosure without departing from the guiding principles which are taught herein.

Example 1

50 grams of 85% lactic acid was heated to 180 degrees C. Thereupon 5 grams of riboflavin was added and the resulting solution was heated at 190 degrees C. for ten minutes. It was then cooled to somewhat below 100 degrees C., diluted with an equal volume of water and neutralized with sodium hydroxide. The solution was then further diluted to produce a clear product containing 10 mg. of riboflavin per cc.

Example 2

50 grams of 85% lactic acid was heated to 150 degrees C. and 5 grams of riboflavin were added with or without 5 cc. of acetic anhydride. The reaction mixture was then heated under reflux at 150 degrees C. for about one and one-half hours and further treated as described in Example 1.

Example 3

This example was carried out as described in Example 2 except that 5 grams of 100% phosphoric acid was used in place of the acetic anhydride.

Example 4

50 grams of 85% lactic acid was heated to 180 degrees C. Thereupon 5 grams of riboflavin was added and the resulting solution was heated at 190 degrees C. for ten minutes. The mixture was then heated under reflux, with stirring, at 150 degrees C. for one and one-half hours. It was then cooled to room temperature, 25 cc. of water was added, and then the reaction mixture was twice extracted, each time with 65 cc. of ether, to remove most of the unreacted lactic acid. The remaining aqueous solution was then diluted to provide a product containing approximately 40 mg. of riboflavin per cc. It may, if desired, be neutralized with an alkali such as sodium hydroxide.

Example 5

50 grams of 85% lactic acid was heated to 180 degrees C. Thereupon 5 grams of riboflavin was added and the resulting solution was heated at 190 degrees C. for ten minutes. The mixture was then heated under reflux, with stirring, at 150 degrees C. for one and one-half hours. It was then cooled to room temperature, 500 cc. of ether was added, the resulting precipitate was filtered off and dissolved in 50 cc. of hot isopropyl alcohol and then, after cooling, reprecipitated with 500 cc. of ether. The precipitate comprised a golden yellow powder assaying 500 mg. of riboflavin per gram.

What we claim as new and desire to protect by Letters Patent of the United States is:

1. The process which comprises reacting riboflavin with at least several times its weight of lactic acid, in the substantial absence of water, at a temperature between about 140 degrees C. and about 190 degrees C.

2. The process which comprises condensing riboflavin with at least several times its weight of lactic acid in the substantial absence of water and in the presence of at least one member selected from the group consisting of acetic anhydride, propionic anhydride, and a phosphoric acid, between about 140 degrees C. and about 190 degrees C.

3. The process of preparing water-soluble derivatives which comprises heating a 9-polyhydroxyalkyl-isoalloxazine with from 7 to 15 parts, by weight, of lactic acid, in the substantial absence of water, at a reaction temperature, between about 140 degrees C. and about 190 degrees C.

4. The process of claim 3, wherein the reaction is carried out in the presence of at least one member selected from the group consisting of acetic anhydride, propionic anhydride, and a phosphoric acid.

5. The process of preparing water-soluble derivatives which comprises heating 1 part, by weight, of a 9-polyhydroxyalkyl-isoalloxazine with about 7 to 15 parts, by weight, of substantially water-free lactic acid, at a temperature of the order of about 140-190 degrees C. until the reaction product obtained is soluble in water to form a substantially clear solution containing not less than 6 mg. of said isoalloxazine per cc.

6. The process of preparing water-soluble derivatives which comprises heating 1 part, by weight, of riboflavin with about 7 to 15 parts, by weight, of substantially water-free lactic acid, at a temperature of the order of about 150-160 degrees C. until the reaction product obtained is soluble in water to form a substantially clear solution containing not less than 6 mg. of said riboflavin per cc.

7. The process of claim 5, wherein the reaction is carried out in the presence of at least one member selected from the group consisting of acetic anhydride, propionic anhydride, and a phosphoric acid.

8. The product produced by the process of claim 5.

9. The product produced by the process of claim 6.

10. A water-soluble condensation product resulting from reacting 1 part of a 9-polyhydroxyalkyl-isoalloxazine with at least several times its weight of lactic acid, in the substantial absence of water, at a temperature between about 140 degrees C. and about 190 degrees C.

11. A condensation product, having a solubility in water of not less than 6 mg. per cc., resulting from reacting 1 part of riboflavin with at least several times its weight of lactic acid, in the substantial absence of water, at a temperature between about 150 degrees C. and about 160 degrees C.

12. The process of preparing water-soluble derivatives which comprises reacting a 9-polyhydroxyalkyl-isoalloxazine with at least several times its weight of lactic acid, in the substantial absence of water, at a temperature between about 140 degrees C. and about 190 degrees C.

BEN L. MAIZEL.
IRVING GERSON.

REFERENCES CITED

The following references are of record in the file of this patent:

UNITED STATES PATENTS

| Number | Name | Date |
|---|---|---|
| 2,423,074 | Zentner | June 24, 1947 |
| 2,449,003 | Moos et al. | Sept. 7, 1948 |